(12) United States Patent
Connelly

(10) Patent No.: US 7,398,084 B2
(45) Date of Patent: Jul. 8, 2008

(54) METHOD AND SYSTEM OF CORRELATING DISSIMILAR CALL RECORDS TO A HIGH LEVEL AGGREGATED VIEW

(75) Inventor: Stephen Philip Connelly, Reston, VA (US)

(73) Assignee: Agilent Technologies, Inc., Santa Clara, CA (US)

( * ) Notice: Subject to any disclaimer, the term of this patent is extended or adjusted under 35 U.S.C. 154(b) by 59 days.

(21) Appl. No.: 11/168,378

(22) Filed: Jun. 29, 2005

(65) Prior Publication Data

US 2007/0004396 A1    Jan. 4, 2007

(51) Int. Cl.
   *H04Q 7/20*    (2006.01)
(52) U.S. Cl. .................. 455/423; 379/115.01; 379/134; 379/133; 379/119; 379/114.03; 379/372
(58) Field of Classification Search .............. 455/412.1; 379/372, 119, 116, 134, 133, 114.03, 115.01
   See application file for complete search history.

(56) References Cited

U.S. PATENT DOCUMENTS

| | | | | |
|---|---|---|---|---|
| 5,687,223 A | | 11/1997 | Elliott et al. | |
| 5,999,604 A | * | 12/1999 | Walter | 379/133 |
| 6,263,071 B1 | * | 7/2001 | Swan et al. | 379/372 |
| 6,275,537 B1 | * | 8/2001 | Lee | 375/240.28 |
| 6,327,350 B1 | * | 12/2001 | Spangler et al. | 379/115.01 |
| 6,359,976 B1 | * | 3/2002 | Kalyanpur et al. | 379/134 |
| 6,801,607 B1 | * | 10/2004 | Marchand et al. | 379/114.14 |
| 6,831,968 B2 | * | 12/2004 | Jarvi et al. | 379/119 |
| 6,891,938 B1 | | 5/2005 | Scott et al. | |
| 2003/0112937 A1 | | 6/2003 | Kreckel et al. | |
| 2006/0140368 A1 | * | 6/2006 | Mark et al. | 379/114.03 |

* cited by examiner

*Primary Examiner*—David Q Nguyen

(57) ABSTRACT

A method of monitoring, and a system to perform the method of monitoring, a mobile network, the method including generating detail records of information transactions in the mobile network; correlating dissimilar detail records from different ones of the monitoring points according to one or more common attributes of the dissimilar detail records, and aggregating at least a portion of the correlated detail records into a single group; and presenting the aggregated detail records in a high level presentation in a graphical user interface.

19 Claims, 7 Drawing Sheets

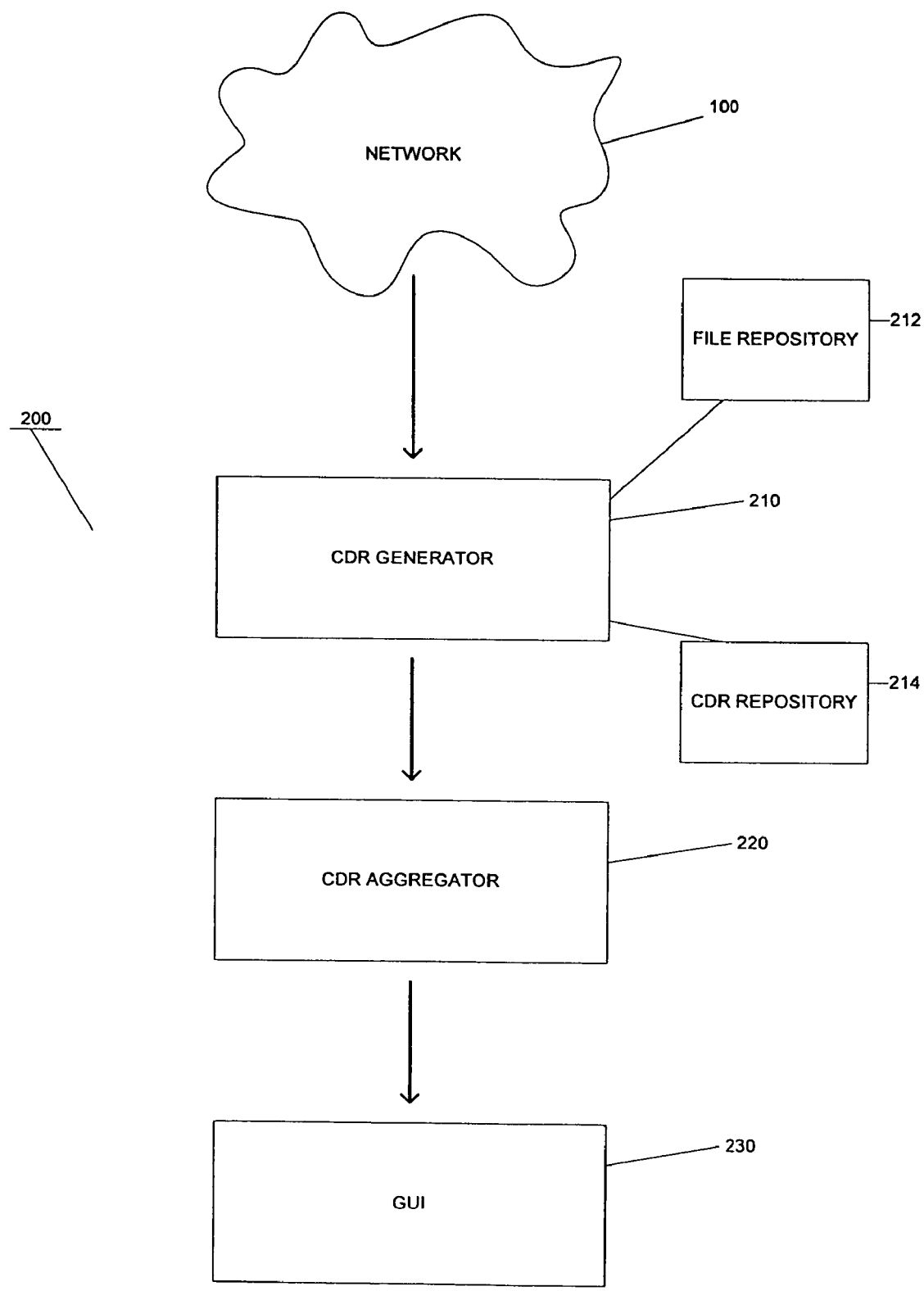

FIG. 3A

| Call Id | Duration | Status | Start Ti | IMSI | IMEI | Oldest TMSI | Latest TMSI | SAI LI | SAI Cs | RAC | Called Part | Calling Part | Service Type | DI |
|---|---|---|---|---|---|---|---|---|---|---|---|---|---|---|
| 0 | 3.02 | | 15:38:37 | | | 03IC149C | 03IC149C | 6128 | 2316 | | | | Location Update | CS |
| 1 | 3.78 | | 15:38:40 | | | 0E59C649 | 0E59C649 | 6128 | 9184 | | | | Location Update | CS |
| 2 | 0.67 | | 15:38:46 | | | 2B11F558 | 2B11F558 | 6126 | 576c | 01 | | | Routing Area Upd... | PS |
| 3 | 2.63 | | 15:38:48 | | | 03IC1591 | 03IC1591 | 6128 | 2316 | | | | Location Update | CS |
| 4 | 3.25 | 2620194390694462 | 15:38:48 | | | D568809C | 2B12176D | 6128 | 2316 | 01 | | | Routing Area Upd... | PS |
| 5 | 1.77 | 2620128002074D2 | 15:38:51 | | | 3A121766 | 3A121766 | 612a | 07b0 | | | | PDP Context | PS |
| 6 | 3.99 | | 15:38:51 | | | 73B17F2D | 73B17F2D | 6128 | 4dba | | | | Location Update | CS |
| 7 | 1.67 | | 15:38:55 | | | 3A11153B | 3A11153B | 6128 | 79b5 | | | | PDP Context | PS |
| 8 | 1.75 | 2620147300068770 | 15:39:01 | | | 3A121766 | 3A121766 | 612a | 07b0 | | | | PDP Context | PS |
| 9 | 4.11 | 2620128002074D2 | 15:39:02 | | | 3F821E93 | 3F821E93 | 6128 | 2696 | | | | Location Update | CS |
| 10 | 3.40 | | 15:39:04 | | | 3F821F2E | 3F821F2E | 6128 | d2a7 | | | | Location Update | CS |
| 11 | 2.30 | | 15:39:08 | | | D9933D4D | 1A021BC0 | 612a | d2a7 | 01 | | | Routing Area Upd... | PS |
| 12 | 3.39 | 2620157100860617 | 15:39:08 | | | 3F821B10 | 3F821B10 | 6128 | 8f1a | | | | Location Update | CS |
| 13 | 1:50.59 | | 15:39:14 | | | 8F508BE8 | 8F508BE8 | 612a | 0abd | | | | Paging Response | CS |
| 14 | 43.00 | 2620141101175779 | 15:39:16 | | | 3B0116DD | 3B0116DD | 6126 | 2e91 | | | | PDP Context | PS |
| 15 | 0.64 | 2620158300787B1 | 15:39:17 | | | 3A1214D1 | 3A1214D1 | 6128 | 4bec | 01 | | | Routing Area Upd... | PS |
| 16 | 3.75 | | 15:39:19 | | | 3F82208D | 3F82208D | 6128 | 8df6 | | | | Location Update | CS |
| 17 | 1.71 | 2620128002074D2 | 15:39:22 | | | 3A121766 | 3A121766 | 612a | 07b0 | | | | PDP Context | PS |

FIG. 3B

| CallId | Duration | Status | StartTime | Establishment C... | INST | IMEI | RoldestTMSI | LatestTMSI | NodeBComm... | CRNCCom... | SRNT | SRNTIdentity | LAC |
|---|---|---|---|---|---|---|---|---|---|---|---|---|---|
| 0 | 2.70 | | 15:38:39 | InterRAT-Cell Res... | | | 0e5c649 | 8f513121 | 601/6924 | 601/6924 | 00009b6d | 003d | 612 |
| 1 | 0.00 | | 15:38:37 | | | | | | | 6945 | | | |
| 2 | 2.12 | | 15:38:50 | InterRAT-Cell Res... | | | 73b1f72d | 8f5132ac | 6643 | 6643 | 0000410B | 003d | 612 |
| 3 | 0.00 | | 15:38:40 | | | | | | 6978 | 6578 | | | |
| 4 | 0.84 | | 15:38:54 | Originating HighPr... | | | 8f46adc | 3a11153b | 632 | 632 | 00059b8a | 003d | 612 |
| 5 | 1.06 | | 15:38:59 | InterRAT-Cell Res... | | | 8f513118 | dcaa66d7 | 2389 | 2389 | 000045da | 002e | 610 |
| 6 | 2.86 | | 15:39:03 | InterRAT-Cell Res... | | | 3f821e93 | 8f51343d | 6956/587 | 6956/587 | 00004117 | 003d | 612 |
| 7 | 2.38 | | 15:39:07 | InterRAT-Cell Res... | | | 8f821f2e | 8f5134d4 | 6964 | 6964 | 00004115 | 003d | 612 |
| 8 | 11.44 | | 15:39:12 | Registration | | | a4610294 | 3b00500a2 | 2373 | 2373 | 000045d0 | 002e | 692 |
| 9 | 0.07 | | 15:39:17 | Registration | | | 8f5103e0 | 3a1214d1 | 547 | 547 | 00009b85 | 003d | 612 |
| 10 | 16.72 | | 15:39:16 | Originating HighPr... | | | 8f512533 | 8f51253f | 6943/626 | 6943/626 | 000041c3 | 003d | 612 |
| 11 | 0.00 | | 15:39:20 | | | | | | 523 | 523 | | | |
| 12 | 0.00 | | 15:39:24 | | | | | | 9424 | 9424 | | | |
| 13 | 0.00 | | 15:39:25 | | | | | | 6984 | 6984 | | | |
| 14 | 0.00 | | 15:39:19 | | | | | | 1945 | 1945 | | | |
| 15 | 1.53 | | 15:39:31 | Originating HighPr... | | | 8f512777 | 8f512777 | 6965 | 6965 | 000041c1 | 003d | 612 |
| 16 | 1.95 | | 15:39:32 | InterRAT-Cell Res... | | | 73b16fb2 | 8f513772 | 6870 | 6870 | 000041bf | 003d | 612 |

METHOD AND SYSTEM OF CORRELATING DISSIMILAR CALL RECORDS TO A HIGH LEVEL AGGREGATED VIEW

BACKGROUND OF THE INVENTION

Telecommunications networks are widely used to link various types of nodes, such as personal computers, servers, gateways, network telephones, and so forth. Networks may include private networks, such as local area networks (LANs) and wide area networks (WAN), and public networks, such as the Internet. Such networks can also be circuit-switched networks in which network resources are dedicated for the entire duration of a data call, and/or packet-switch networks, such as Internet Protocol (IP) networks in which network resources are shared and data in the form of packets or cells are routed independently across the networks along with other user traffic to a destination. Examples of packet-switched networks include Asynchronous Transfer Mode (ATM) networks, Ethernet or Frame Relay, which are based on a virtual circuit model. Popular forms of communications across such networks include electronic mail, file transfer, web browsing, and other exchange of digital data including audio (e.g., voice) and multimedia (e.g., audio and video).

Modern telecommunications networks typically include two related but separate network infrastructures: a bearer or transmission network for carrying end-user voice and data traffic, and a signaling network for controlling the setup and release of bearer channels through the bearer network in accordance with control signals transferred through the signaling network. In practice, such signaling networks comprise high-speed computers interconnected by signaling links, and computer programs implemented to provide a set of operational and signaling functions in accordance with a standardized protocol, such as, for example, the Signalling System No. 7 (SS7) which is being extensively deployed for control of mobile telephony and other data transmission networks. The signaling links are used for passing signaling information (e.g., messages) between nodes in the signaling networks. The signaling information (e.g., messages) can be captured to generate detail records, such as Call Detail Records (CDRs) or Transaction Detail Records (TDRs), for storage in a database system which can be subsequently monitored and analyzed for a wide variety of applications, including, for example, quality of service applications and business intelligence applications. In addition to the detail records, other related information-sent between nodes, switches or devices in such mobile networks can also be used for authentication, equipment identification and roaming enablement.

Commercially available tools for mobile telephony networks may be used for monitoring the performance (or quality) of a network based on the detail records stored in the database system to observe possible obstacles and track performance statistics in the network. Typically, such monitoring tools are based on monitoring the network for malfunctions at the level of network elements, such as switches or interfaces, for traffic-related information. However, such actions will result in the collection of vast amounts of data, which makes it difficult and time consuming for an end user attempting to identify problems in the network and perform analysis of the collected data, especially when the detail records are being viewed in real time. The detail records, such as Call Detail Records (CDRs), may be dissimilar, i.e., may have different types of criteria used regarding values captured for the particular CDRs, according to several factors such as the monitoring point in the network at which the respective detail records are captured, the different protocols being used to set up and transport voice and data calls in the network, different types and brands of equipment used to transport the voice and data calls, etc. Therefore, with the different protocols and equipment and the plurality of different monitoring points in the network at which this information is captured, as well as the vast amount of detail records that may be captured at each of these monitoring points, the information quickly becomes overwhelming, at least partly due to the fact that there are dissimilar detail records, i.e., detail records having different attributes, captured.

Accordingly, there is a need for improved tools, systems and methods for the management and analysis of detail records in such networks, including the ability to provide a user with a way to view the various dissimilar CDRs on an aggregated basis, wherein the CDRs may be presented in a high level view in a simplified format according to attributes that are common to all the dissimilar CDRs.

SUMMARY OF THE INVENTION

Various aspects and example embodiments of the present invention advantageously provide tools, systems and methods for the management and analysis of detail records in a mobile telephony network, including correlating dissimilar detail records in a high level aggregated view. The dissimilar detail records may be grouped in a simplified fashion according to attributes common to all of the detail records, and a user may then select detail records from the aggregated view to perform more detailed analysis of the selected detail records.

Additional aspects and/or advantages of the invention will be set forth in part in the description which follows and, in part, will be obvious from the description, or may be learned by practice of the invention.

According to one aspect of the present invention a system is provided to monitor a mobile network, the system comprising a data record generator to receive a data stream from one or more monitoring points of the mobile network and generate detail records of information transactions in the mobile network; a data record aggregator to receive the detail records from the data record generator, correlate dissimilar detail records from different ones of the monitoring points according to one or more common attributes of the dissimilar detail records, and aggregate at least a portion of the correlated detail records into a single group; and a user input to provide a visual display of the aggregated detail records in a high level presentation.

The aggregated detail records may be displayed in a form having less information than comprised in the respective generated detail records.

A user may determine, through the user input, an amount of the information presented in the aggregated detail records.

The aggregated detail records displayed may comprise at least one of the common attributes of the dissimilar detail records.

A complete detail record may be displayed in response to a user selecting one of the aggregated detail records displayed, via the user input.

A user may determine, through the user input, the one or more common attributes used to correlate the dissimilar detail records to be displayed in the aggregated group.

The information transactions of dissimilar detail records may have different end-to-end destinations within the mobile network.

The aggregated detail records may be displayed, via a plurality of user inputs for a plurality of users.

Each of the plurality of users may determine the one or more common attributes used to correlate the dissimilar detail records to be displayed in the respective aggregated group.

Each of the plurality of users may determine an amount of the information displayed in the respective aggregated group.

The one or more common attributes of the dissimilar detail records may include one of a call type, start time, end time, success status, failure reason, or a combination thereof.

At least one of the one or more common attributes may be extracted by the data record aggregator from different information comprised in the dissimilar detail records.

The user input may comprise a graphical user interface (GUI).

According to another aspect of the invention, a method of monitoring a mobile network is provided, the method comprising receiving a data stream from one or more monitoring points of the mobile network and generating detail records of information transactions in the mobile network; correlating dissimilar detail records from different ones of the monitoring points according to one or more common attributes of the dissimilar detail records, and aggregating at least a portion of the correlated detail records into a single group; and providing a visual display of the aggregated detail records.

The method may further comprise displaying the aggregated detail records in a form having less information than comprised in the respective generated detail records.

The method may further comprise a user determining, via the user input, an amount of the information displayed in the aggregated detail records.

The aggregated detail records displayed, via the user input, may comprise at least one of the common attributes of the dissimilar detail records.

The method may further comprise displaying a complete detail record in the user input in response to a user selecting one of the aggregated detail records displayed, via the user input.

The method may further comprise a user determining, via the user input, the one or more common attributes used to correlate the dissimilar detail records to be displayed in the aggregated group.

The method may further comprise displaying the aggregated detail records, via a plurality of user inputs for a plurality of users.

The method may further comprise each of the plurality of users determining the one or more common attributes used to correlate the dissimilar detail records to be displayed in the respective aggregated group.

The method may further comprise each of the plurality of users determining an amount of the information presented in the respective aggregated group.

The user input of this method may comprise a graphical user interface (GUI).

According to another aspect of the present invention, a computer readable medium encoded with processing instructions to perform a method of monitoring a mobile network is provided, the method comprising receiving a data stream from one or more monitoring points of the mobile network and generating detail records of information transactions in the mobile network; correlating dissimilar detail records from different ones of the monitoring points according to one or more common attributes of the dissimilar detail records, and aggregating at least a portion of the correlated detail records into a single group; and providing a visual display of the aggregated detail records.

The method performed by the computer readable medium may further comprise displaying the aggregated detail records, via a user input in a form having less information than comprised in the respective generated detail records; and displaying a complete detail record in the user input in response to a user selecting one of the aggregated detail records displayed, via the user input.

The user input in the method performed by the computer readable medium may be a graphical user interface (GUI).

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 2 is a block diagram of the mobile telephony network including an apparatus to correlate and aggregate data records, call data records (CDRs) in this embodiment, and provide a visual display of the CDRs according to an embodiment of the present invention;

FIGS. 3-4 illustrate example CDRs that may be correlated and aggregated according to various embodiments of the present invention;

DETAILED DESCRIPTION OF THE EMBODIMENTS

Figure 1:
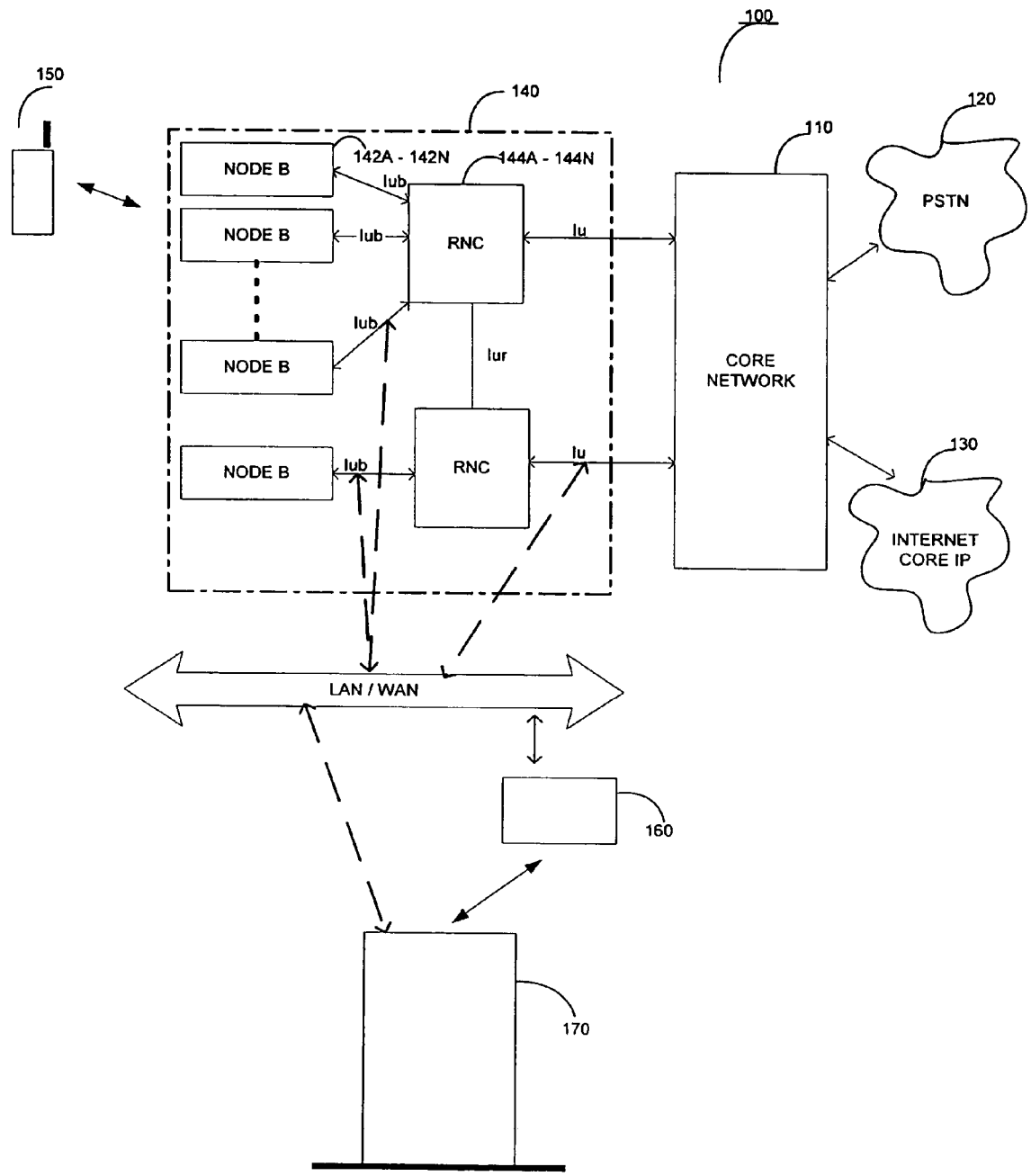
FIG. 1 illustrates an example mobile telephony network and monitoring systems used for signaling analysis of the mobile telephony network.

Before beginning a detailed description of the subject invention, mention of the following is in order. When appropriate, like reference numerals and characters may be used to designate identical, corresponding or similar components in differing figure drawings. Further, in the detailed description to follow, example sizes/values/ranges may be given, although the present invention is not limited to the same. The present invention is also applicable for use with all types of telecommunication networks, including, for example, an Integrated Systems Digital Network (ISDN), a Voice over IP (VoIP) network, the Internet, or mobile telephony networks, such as a Global System for Mobile communication (GSM) network, a General Packet Radio Service (GPRS) network, or a Universal Mobile Telecommunications System (UMTS) network, and the next generation of wireless networks which may become available as technology develops, including CDMA technologies for wireless data services and applications, such as wireless email, web, digital picture taking/sending and assisted-GPS position location applications, and compatible network protocols, such as hyper text transfer protocols (HTTP), file transfer protocols (FTP), VoIP protocols, and UMTS protocols as defined by 3GPP group (see http://www.3gpp.org). However, for the sake of simplicity, discussions will concentrate mainly on exemplary use of a UMTS mobile network, although the scope of the present invention is not limited thereto.

Attention now is directed to the drawings and particularly to FIG. 1, in which an example mobile telephony network, such as a universal mobile telecommunications system (UMTS) network, is illustrated. As shown in FIG. 1, the mobile telephony network 100 includes a core network 110 which supports circuit-switched networks such as a public switch telephone network (PSTN) 120, and/or packet-switched networks such as Internet Core IP 130; and a radio access network 140 connected to the core network 110 to support communications with user equipment (UE) 150 which is typically a mobile phone, a video phone or a personal digital assistant (PDA). Typically, the core network 110 contains a mobile switching center (MSC) (not shown) supporting communications, via the circuit switched networks such as PSTN 120, and one or more support nodes (not shown) providing a gateway to the packet-switched networks such as the Internet core IP 130 and controlling the connection between the network and the user equipment (UE) 150 for wireless communications. The radio access network 140 includes one or more nodes "B", also known as base stations, 142A-142N, and one or more radio network controllers (RNCs) 144A-144N connected to the localized group of nodes 142A-142N to select the most appropriate node for the user equipment (UE) 150 and perform handover during wireless communications, when necessary. Network architecture and implementation of the UMTS network 100, including backbone ATM switches, interfaces such as "Iu" disposed between the RNCs144A-144N and the core network 110, "Iur" disposed between the RNCs 144A-144N, "Iub" disposed between the RNCs 144A-144N and the corresponding nodes 142A-142N, signaling links between nodes and network elements within the UMTS network 100, and signaling information passing between the signaling links are well-known and, as a result, need not be described in detail herein. However, for purposes of brevity, the signaling information represents data regarding the establishment, control and management of functions of the network 100. Detail records, such as, Call Detail Records (CDRs) of a specific call or Transaction Detail Records (TDRs) of a specific data session can be constructed from signaling information transmitted between signaling links within the mobile telephony network 100. The terms "CDR" and "TDR" may be used interchangeably in the context of a mobile telephony network 100 disclosed herein. Similarly, the terms "call" and "data session" can also be used interchangeably, and can be broadly described simply as a "transaction".

Typically, CDRs may have different structures or formats used to define telephone calls originating on land-line telephones, telephone calls terminating on land-line telephones, telephone calls originating on mobile telephones, telephone calls terminating on mobile telephones, and so on. However, for purposes of simplicity, CDRs as referred to herein shall represent generic CDRs. Each CDR may correspond to a collection of messages comprising parameters and time-stamps associated with each call which provides details regarding the call origin, destination, and other various details. The parameters and time-stamps associated with each message or collection of information referred to as the "CDR" are the primary pieces of information needed to determine who called whom, how the call was routed, and the call disposition for signaling analysis. These CDRs can be monitored and analyzed for a wide variety of applications, including, for example, quality of service applications and business intelligence applications.

As shown in FIG. 1, a monitoring system 160 can be configured to capture traffic, including signaling data, on all key interfaces, including "Iub" interfaces and "Iu" interfaces or other signaling links, within the mobile telephony network 100 for signaling analysis of the mobile telephony network 100. Such a monitoring system 160 can be coupled to interfaces such as "Iub" interfaces connecting one of the RNCs 144A-144N to at least one node 142A-142N, or "Iu" interfaces connecting the RNCs 144A-144N to the core network 110, or ATM switches, either directly, or via a local or wide area network (LAN/WAN), to capture signaling data at a particular interface or signaling link and provide captured signaling data for analysis or collection by a computer (database) system 170. The monitoring system 160 may be, for example, an Agilent™ G6801A Distributed Network Analyzer (DNA) used for capturing all signaling data from a particular signaling link (i.e., interface within the mobile telephony network 100) that relates to a single call or data session, for example, and for controlling the distribution of the signaling data for real-time network testing and analysis, including diagnostics of quality of services and troubleshooting. In addition, software applications, such as Agilent™ J7326A Signaling Analyzer software (SAS), can be also be installed on the computer system 170, which can be an independent server or host computer system, to decode and analyze captured signaling data locally, with a real-time display. The SAS can also be stored on the monitoring system 160 or any computing system, such as an external PC, a laptop, or a server coupled to a local area network (LAN). The captured signaling data can represent a large number of calls/sessions and can be visually displayed, via a user-configurable window or table format, so that a user (i.e., network administrator or maintenance personnel) can trace each call occurring on the mobile telephony network 100.

Typically, the monitoring system 160 creates Detail Records, such as CDRs, which are assembled by piecing together individual frames of incoming data streams that are being transported across the mobile telephony network 100. These CDRs can then be displayed, for example, at the computer system 170 and, alternatively, can be saved for later signaling analysis, potentially leaving a long time before signaling analysis can be realized and remedial actions can be taken in response to the signaling analysis. However, when viewing calls within the monitoring system 160 and/or the computer system 170 in real-time, the user (i.e., network administrator or maintenance personnel) can be overwhelmed with the deluge of calls that can take place within the mobile telephony network 100.

Turning now to FIG. 2, an example of a data record Correlator and Aggregator system 200 to monitor the mobile telephony network 100 according to an embodiment of the present invention is illustrated. Although the system illustrated in this embodiment performs processes involving CDRs monitored in the mobile telephony network 100, the system may process other kinds of data records associated with any telecommunication network. The data record Correlator and Aggregator system 200 correlates dissimilar CDRs in order to provide an aggregated high level view of the health of the mobile telephony network by providing a user, e.g., a network administrator, an easy to read high-level view of the health of calls occurring in the mobile telephony network 100. The data record Correlator and Aggregator system 200 may be provided either partially or wholly on the monitoring system 160 and/or the computer system 170, or may be provided in a separate unit or units connected to the monitoring system 160 and/or the computer system 170.

As shown in FIG. 2, the data record Correlator and Aggregator system 200 comprises three elements: a CDR Generator 210 which receives an incoming data stream made of individual frames (messages) that make up each call from a signaling link (i.e., interface) within the mobile telephony network 100, and, upon receipt of the incoming data stream, stores individual frames of raw data in data files (e.g., SAL files) provided in a file repository 212, and then generates data records such as CDRs corresponding to the calls that are being transported across the mobile telephony network 100 and stores the CDRs in a CDR repository 214; a CDR Aggregator 220 which receives the data records such as CDRs from the CDR Generator 210 and correlates the CDRs to an aggregated form according to attributes that are common to the received CDRs, wherein CDRs that are collected from one point in the mobile telephony network 100 are dissimilar from CDRs that are collected from a separate point or points in the mobile telephony network 100; and a user input, represented in this embodiment as a graphical user interface (GUI) 230, which enables the user to review calls being transported on the mobile telephony network 100 in an easily readable high level view which shows at least some of the common attributes of the dissimilar CDRs determined by the CDR Aggregator 220, to be notified when a problem with the mobile telephony network 100 has occurred, and to drill down to the specific CDR of a problem call in order to more fully investigate the root of the problem of the problem call. A high level view refers to a display that is organized and presented to be easily viewed and understood by the user, as opposed to a less easily viewed data storage format such as a CSV (Comma Separated Values) file format.

The CDR Generator 210, the CDR Aggregator 220, and the GUI 230 can be software modules written via a variety of software languages, including C, C++, Java, Visual Basic, and many others. The various software modules may also be integrated in a single application executed on one or more control units (not shown), such as a microprocessor, a microcontroller, or a processor card (including one or more microprocessors or microcontrollers) in the computer system 170, for example, as shown in FIG. 1. Alternatively, the software modules can also be distributed in different applications executed by different computing systems, such as the monitoring system 160, the computer system 170, or any other computing devices connected to the mobile telephony network 100. For example, the CDR Generator 210 may reside on the monitoring system 160, as shown in FIG. 1. The CDR Aggregator 220 may reside on the computer system 170. Similarly, the GUI 230 may reside on the same computer system 170, or alternatively, another computing device, such as an external PC, a laptop, or a server coupled to a local area network (LAN). Alternatively, components of the CDR Generator 210, the CDR Aggregator 220 and the GUI 230 can also be integrated in a single application which can be installed at a single computing device, such as the computer system 170, as shown in FIG. 1.

These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs).

Instructions of the software routines or modules may also be loaded or transported into the monitoring system 160, the computer system 170 or any computing devices on the mobile telephony network 100 in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

The CDR Generator 210 is arranged to receive an incoming data stream made up of individual frames (messages) which represent calls that have occurred or are occurring on the mobile telephony network 100, to package individual frames or messages that make up each call in a separate and discrete data file, known as an SAL file, to store packaged data files in the file repository 212, and then generate data records such as CDRs corresponding to the calls that have occurred or are occurring on the mobile telephony network 100 and store the CDRs in the CDR repository 214. These may also be provided to the CDR Aggregator 220 according to parameters set by the user. The CDRs may have different attributes according to the respective monitoring points within the mobile telephony network 100 at which the data streams are captured. For instance, a first set of CDRs generated at an interface Iub between a node "B" 142A and an RNC 144A may have a first set of attributes according to the protocols and/or equipment used in generating the first set of CDRs, while a second set of CDRs generated at an interface Iu between the RNC 144A and the core network 110 may have a dissimilar second set of attributes according to the protocols and/or equipment used in generating the second set of CDRs.

For example, two possible types of dissimilar CDRs are shown in FIGS. 3A-3B, which illustrate a visual display of different types of CDRs obtained from different signaling links (i.e., interfaces) in the mobile telephone network 100 on a computer system 170. Specifically, FIG. 3A illustrates a visual display of example CDRs obtained from an "Iu" interface disposed between the RNCs 144A-144N of the radio access network (RAN) 140 and the core network 110 of the mobile telephony network 100. Alternatively, FIG. 3B illustrates a visual display of example CDRs obtained from an "Iub" interface disposed between the RNCs 144A-144N and the corresponding nodes 142A-142N of the radio access network (RAN) 140 of the mobile telephony network 100.

As shown in FIG. 3A and FIG. 3B, each row in the display on the database system 170 represents a call that has occurred or is occurring on the mobile telephony network 100. Each column contains parameters that are particular for a specific call trace which may indicate specific problems. The parameters utilized for an "Iu" interface, as shown in FIG. 3A, may include, for example, Call ID, Duration, Status, Start Time, Establishment Cause, IMSI, IMEI, Oldest TMSI/P-TMSI, Latest TMSI/P-TMSI, SAI LAC, SAI SAC, RAC, Called Party BCD Number, Calling Party BCD Number, Service Type, Domain, SCCP Release Cause, RANAP Cause, Setup Time, Cleardown Time, Speech Path/CID, Bad Speech Frames, IPv4 Address, Uplink Packets, Downlink Packets, Uplink Octets, Downlink Octets, Uplink Rate bp/s, and Downlink Rate bp/s. Similarly, the parameters utilized for an "Iub" interface, as shown in FIG. 3B, may include, for example, Call ID, Duration, Status, Start Time, Establishment Cause, IMSI, IMEI, Oldest TMSI/P-TMSI , Latest TMSI/P-TMSI, Node B CommCtx ID, CRNC CommCtx ID, S-RNTI, SRNC Identity, LAC, RAC, Cell Identifier, Service Type, Domain, SCCP Release Cause, RANAP Cause, Setup Time, Cleardown Time, Speech Path/CID, Bad Speech Frames, IPv4 Address, Uplink Packets, Downlink Packets, Uplink Octets, Downlink Octets, Uplink Rate bp/s, and Downlink Rate bp/s.

"Call ID" may represent a unique identifier of a specific call; "Duration" may represent a duration of the completed call; "Status" may represent whether a call is active or terminated. "Start Time" may represent the start time of the call; "IMSI" may represent an International Mobile Subscriber Identity of a subscriber initiating the call; "IMEI" may represent an International Mobile Equipment identify of equipment manufacturers; "Oldest TMSI/P-TMSI" may represent a Temporary Mobile Subscriber Identity (TMSI) and the packet TMS; "Latest TMSI/P-TMSI" may represent the latest TMSI and the packet TMSI; "SAI LAC" may represent a Service Area Identifier of the Location Area Code; "SAI SAC" may represent a Service Area Identifier of the Routing Area Code; "Called Party BCD Number" may represent a Called Party Binary Coded Decimal Number; "Calling Party BCD Number" may represent a Calling Party Binary Coded Decimal Number; "Node B CommCtx ID" may represent an identifier of the Communication Context in the Node B; "CRNC CommCtx ID" may represent an identifier of the Communication Context of the Node B in the Radio Network Controller (RNC); "S-RNTI" may represent a serving Radio Network Temporary Identity; "SRNC Identity" may represent a serving Radio Network Controller Identity; "LAC" may represent a Location Area Code which identifies a location area within the mobile network 100; "RAC" may represent a Routing Area Code within a location area; "Cell Identifier" may represent an identifier of a cell in one Radio Network Controller (RNC); "Service Type" may represent a type of service that occurred during the duration of a call; "Domain" may represent a type of network in which a call is transmitted: Circuit Switched (CS) or Packet Switched (PS); "Release Cause" may represent a criteria for the call to be released; "RANAP Cause" may represent text description of a cause; "Setup Time" may represent a time taken to set up a call or session; "Cleardown Time" may represent a time taken to clear down a call or session; "Speech Path/CID" may represent VCI/CID that is used for the call; "Bad Speech Frames" may represent a count of the number of bad speech frames that were detected during a call which indicates the level of quality of voice calls during a call; "IPv4 Address" may represent the Internet Protocol Version #4 address; "Uplink Packets" may represent a count of the number of IP packets that the user equipment (UE) has sent to the mobile network 100 during a data session; "Downlink Packets" may represent a count of the number of IP packets that the user equipment (UE) 110 has received from the mobile network 100 during a data session; "Uplink Octets" may represent the count of the number of IP octets that the user equipment (UE) 110 has sent to the mobile network 100 during a data session; "Downlink Octets" may represent a count of the number of IP packets that the user equipment (UE) has received from the mobile network 100 during a data session; "Uplink Rate bp/s" may represent the average data transfer rate in bits/second that the user equipment (UE) 110 has experienced while sending data to the mobile network 100; and "Downlink Rate bp/s" may represent an average data transfer rate in bits/second that the user equipment (UE) 110 has experienced while receiving data from the mobile network 100.

As can be seen from FIGS. 3A-3B, calls and call ID variables obtained from different signaling links (i.e., interfaces) in the mobile telephony network 100 can be different, and have several different characteristics, which results in the dissimilar CDRs. Nevertheless, the dissimilar CDRs associated with these calls can have common characteristics, or attributes, such as Call Type, Start Time, End Time, Successful, or Failure Reason, all of which can be analyzed to identify and pinpoint problems in the mobile telephony network 100. Certain ones of these common attributes, such as the Start Time, may be contained as such within the CDRs as they are stored, and other ones of the common attributes, such as the Failure Reason, may be derived from other information stored in the CDRs. Therefore, it is important to provide a user (i.e., a network administrator or maintenance personnel) with improved tools, systems, and methods for the management and analysis of detail records in such a mobile telephony network 100, including the ability to monitor all calls occurring in the mobile telephony network 100 for a specific type of calls that are of interest, such as, for example, only failed calls, the ability to view dissimilar CDRs in an aggregated view that shows the CDRs in a less than complete and easy to read format according to the aforementioned common attributes, the ability to store remotely and retrieve the complete CDRs given a specific call or data session, and the ability to further view the complete frame level detail of the complete CDR for specific signaling analysis in such a mobile telephony network 100.

Returning now to FIG. 2, the CDR Aggregator 220 receives the data records such as the CDRs from the CDR Generator 210 and correlates the CDRs to an aggregated form according to attributes that are common to the received CDRs. The CDR Aggregator 220 receives instructions from a user, which may be entered through the GUI 230, regarding which CDRs are to be correlated. In other words, the user determines which monitoring points in the mobile telephony network 100 are going to be monitored, and instructs the CDR Aggregator 220 to receive the CDRs associated with the selected monitoring points from the CDR Generator 210. For instance, if the user wishes to monitor the two points in the mobile telephony network 100 that are illustrated in FIGS. 3A-3B, the user would instruct the CDR Aggregator 220 to receive from the CDR Generator 210 the CDRs associated with the "Iu" interface disposed between the RNCs 144A-144N of the RAN 140 and the core network 110 illustrated in FIG. 3A, and the CDRs associated with the "Iub" interface disposed between the RNCs 144A-144N and the corresponding nodes 142A-144N of the RAN 140 illustrated in FIG. 3B. These two points in the mobile telephony network 100 have been used merely as an example, as the user can determine any combination of the monitored points in the mobile telephony network 100. The user can also determine many other parameters by which the CDRs would be received by the CDR Aggregator 220, such as discrete time periods from which to receive the desired CDRs.

Upon receiving the instructions from the user, the CDR Aggregator 220 receives the desired CDRs and correlates, or combines, the CDRs into an aggregated form according to the common attributes between the dissimilar CDRs. The common attributes may already exist as specific elements of the dissimilar CDRs, or the CDR Aggregator 220 may extract the common attributes from the dissimilar CDRs. The common attributes may be selected by the user. For instance, the user may wish to view all of the CDRs from the selected two monitoring points according to their start times and whether the call was successful. The CDR Aggregator 220 would then correlate the dissimilar CDRs such that all of the CDRs could be viewed by the user with only these two attributes shown. In other words, the CDR Aggregator 220 transmutes the CDRs from the form in which they are received from the CDR Generator 210 into a simplified form that is more easily read and understood by the user. Some of the common attributes, such as the start times, may already be explicitly shown in the CDRs, and some of the common attributes, such as whether the call was successful, may be extracted by the CDR Aggregator 220 from the CDRs as provided by the CDR Generator 210. Although much of this description specifically discusses dissimilar CDRs that are to be aggregated, there may of course also be similar CDRs which will be used to form the correlated and aggregated list, either from within one set of CDRs from a single monitoring point, or from different sets of similar CDRs taken from different monitoring points.

Therefore, the CDR Aggregator 220 receives two or more sets of dissimilar CDRs from the CDR Generator 210, and correlates the dissimilar CDRs according to common attributes so that the CDRs may be viewed in an aggregated form which shows the CDRs in a simpler form that is easier for a user to work with. In other words, rather than simply combining the dissimilar CDRs into an aggregated form which shows the complete CDRs, i.e., all of the stored parameters applicable to each of the CDRs, the user is able to view a simplified version of the CDRs which may focus only on the attributes that are of concern to the user. Further, the CDR Aggregator 220 may prepare an aggregated form of the dissimilar CDRs in which only certain ones of the dissimilar CDRs are represented. For example, if the user only wants to see the failed calls from two different monitoring points, and the start times of the failed calls, the CDR Aggregator 220 would prepare an aggregated form for the user to view which would only contain the failed calls from the dissimilar CDRs, along with the start times of the failed calls. Because only the failed calls from the two monitoring points would then be viewed by the user, rather than all of the calls contained in the dissimilar CDRs, and only the failure status and start times of each of the calls would be presented in the aggregated view, rather than all of the parameters stored in the dissimilar CDRs, the view presented to the user is much easier to analyze.

The high level view presentation provided to the user by the CDR Aggregator 220 is presented in the GUI 230. The user may submit to the CDR Aggregator 220, through the GUI 230, such information as which monitoring points in the mobile telephony network 100 the user wishes to analyze, which common attributes by which the CDR Aggregator 220 should correlate the dissimilar CDRs, which common attributes of the dissimilar CDRs the user wishes to view, and so on. Also, the GUI 230 may be configured to notify the user when a problem has occurred within the mobile telephony network 100, so that the user may then choose or change the monitoring points and/or attributes which are being monitored.

Further, the GUI 230 may be configured such that the user is able to choose one or more calls from the aggregated view to "drill down" to the actual CDR associated with the respective one or more calls for more detailed analysis of the call. As an example, if the user is viewing a correlated and aggregated view in which only failed calls from dissimilar CDRs are displayed along with the start times of the failed calls, the user may then select a CDR via the GUI 230. The CDR Aggregator 220 will provide the complete CDR associated with the selected call. The complete CDR may still be stored in the CDR Aggregator 220 from the correlation and aggregating process, or the CDR Aggregator 220 may obtain the complete CDR through the CDR repository 214 used by the CDR Generator 210 to store the generated CDRs. Further, if even more detailed analysis is desired by the user, the user may also request a further "drill down" operation based on the frame messages corresponding to the selected CDR stored in the file repository 212.

Figure 4:
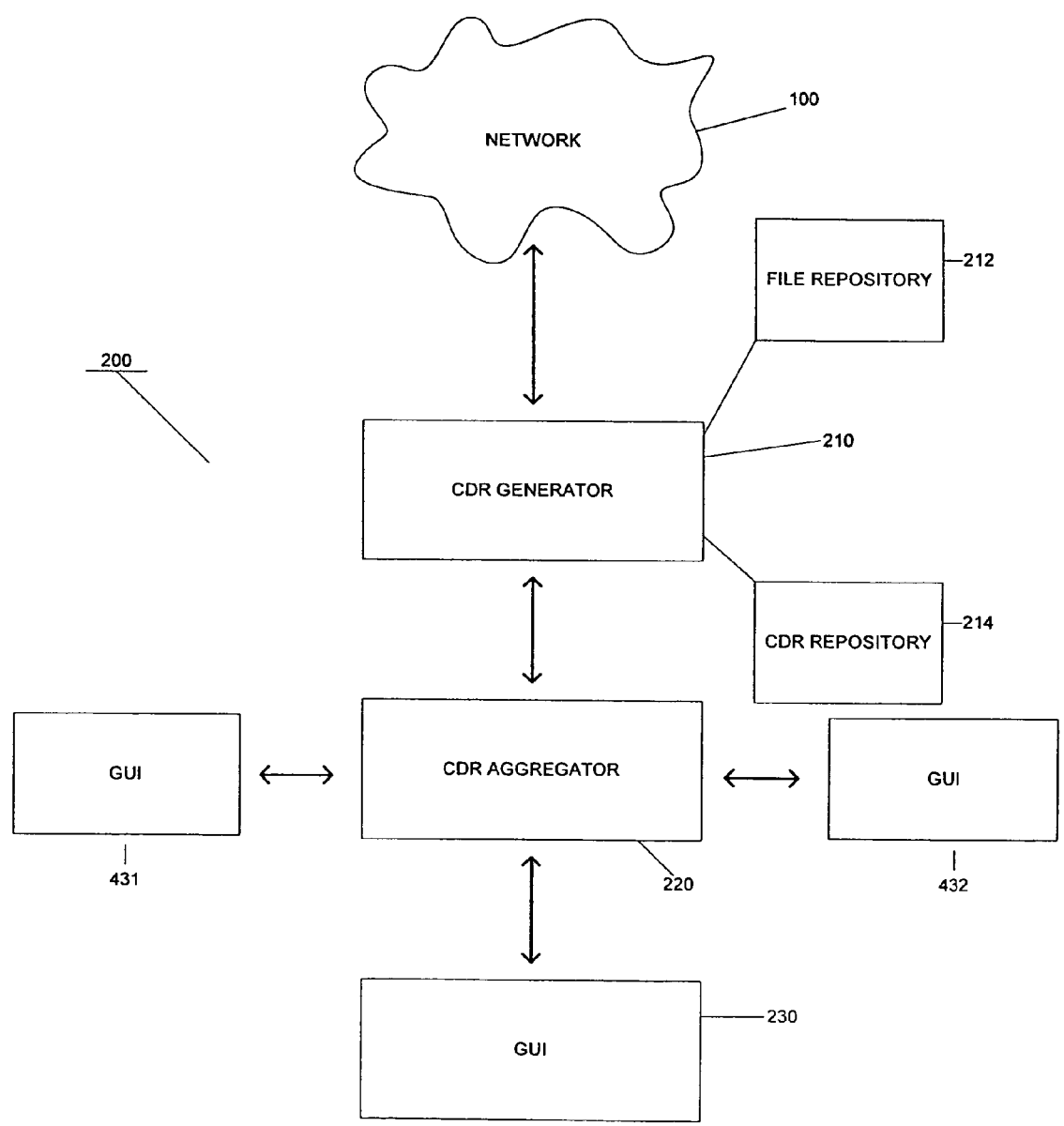

FIG. 4 illustrates another embodiment of the present invention, in which multiple GUIs 230, 431, and 432 are provided so that multiple users may monitor any different number of monitoring points within the mobile telephony network. Although FIG. 4 illustrates an embodiment in which three GUIs 230, 431, and 432 are provided for different users, it is to be understood that any number of GUIs may be provided. Each user provided with a GUI may then set the parameters by which the CDR Generator 210 would receive CDRs from the CDR Generator 210 and perform the correlation and aggregation process on the received CDRs. For instance, one user may be monitoring failed calls and start times during a certain period at two monitoring points, while another user may be monitoring the call types of calls occurring at three different monitoring points during the same or another period of time.

Figure 5:
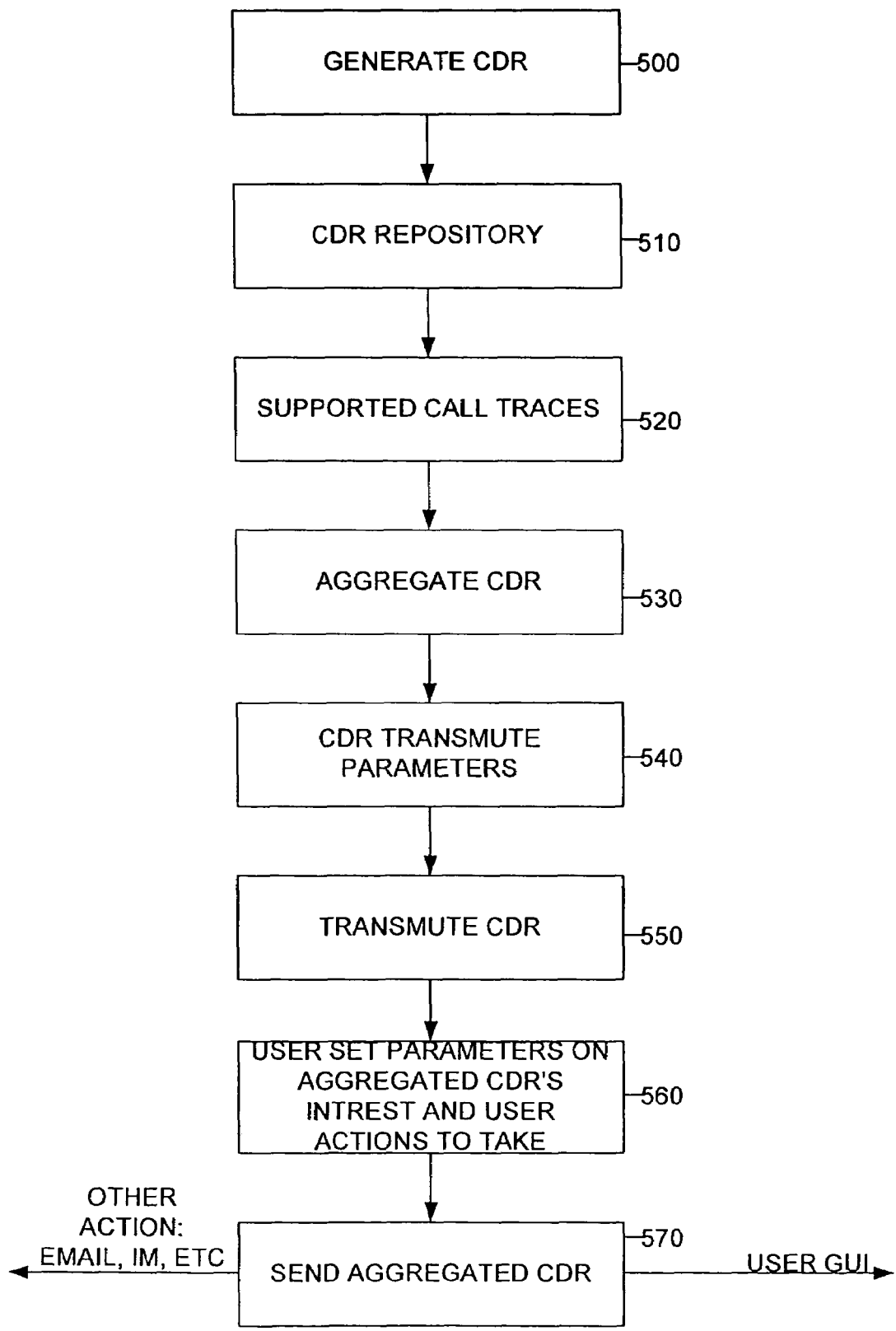
FIG. 5 illustrates a method of correlating dissimilar CDRs and displaying the correlated CDRs in a user input according to an embodiment of the present invention.

FIG. 5 illustrates a method of correlating dissimilar CDRs and displaying the correlated CDRs in an aggregated view, via a user input, according to an embodiment of the present invention. In operation 500, the CDR Generator 210 receives a data stream from one or more monitoring points within the mobile telephony network 100 and generates CDRs from the data stream. In operation 510, the CDR Generator 210 provides the generated CDRs to the CDR repository 214 for storage. In operation 520 a user provides the CDR Aggregator 220 with information regarding which monitoring points in the mobile telephony network 100 at which the user wishes to monitor and analyze data. In other words, the user provides the CDR Aggregator 220 with information regarding from which call traces being performed in the mobile telephony network 100 that the user wishes to analyze the associated CDRs. In operation 530 the CDR Aggregator 220 receives CDRs generated by the CDR Generator 210 according to the information provided by the user, and proceeds to aggregate the CDRs so that dissimilar CDRs from different monitoring points in the mobile telephony network 100 are combined into a single list of CDRs. The CDR Generator 210 may provide the CDRs to the CDR repository 214 and to the CDR Aggregator 220 simultaneously so that the CDR Aggregator 220 may receive the CDRs in real time. In operation 540 the parameters by which the CDR Aggregator 220 is to transmute the received CDRs are provided by the user. In other words, the user provides the CDR Aggregator 220 with the attributes the user wishes to be used to assemble the aggregated CDRs. In operation 550 the CDR Aggregator 220 transmutes the CDRs to a correlated form according to the parameters set by the user in operation 540. More detail regarding the transmutation process of operation 550 is given later during a discussion of FIG. 6. In operation 560 the user provides the CDR Aggregator 220 with parameters regarding what actions are to be taken with the aggregated and transmuted CDRs. These parameters may include which of the transmuted CDRs the user wishes to view, e.g., whether the user would like to see only certain ones of the transmuted CDRs according to certain common attributes, which of the attributes of the transmuted CDRs the user would like to see, whether the user would like to be notified of certain problem calls, and so forth. And in operation 570 the aggregated transmuted CDRs are provided to the user or users according to the parameters set by the user in operation 560. Possible modes of delivery of the aggregated CDRs are by displaying the CDRs, via a user input such as the GUI 230, delivering the CDRs through an electronic communication method such as email or instant messaging, or other communication modes.

Figure 6:
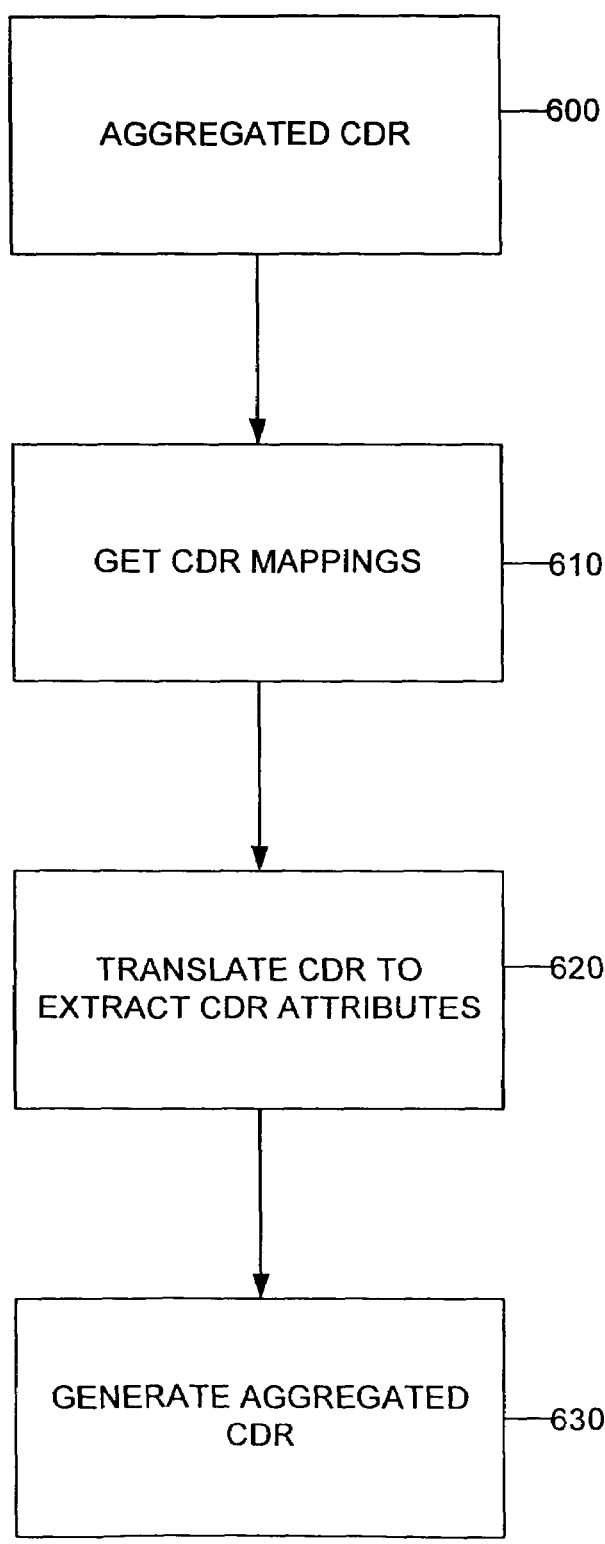
FIG. 6 illustrates a transmutation process of FIG. 5 according to an embodiment of the present invention.

FIG. 6 illustrates the transmutation process 550 of FIG. 5 according to an embodiment of the present invention. In operation 600 the CDR Aggregator 220 determines whether the CDRs received from the CDR Generator 210 have been aggregated so as to be contained in a single set of CDRs. Upon determining that the supported CDRs have been aggregated, in operation 610 the CDR Aggregator 220 determines the CDR mappings of the CDRs which allow the CDR Aggregator 220 to determine the common attributes of the received CDRs. The CDR mappings allow the CDR Aggregator 220 to determine what the parameters for each of the dissimilar CDRs are, and use the values associated with the respective parameters to determine the common attributes. As discussed earlier in this description, some common attributes of the dissimilar CDRs will be the values contained in the dissimilar CDRs themselves, as the dissimilar CDRs may share common parameters, but other common attributes of the dissimilar CDRs may have to be extracted from dissimilar values contained within the dissimilar CDRs. In operation 620 the CDR Aggregator 220 translates the dissimilar CDRs into CDRs having common attributes according to the CDR mappings determined in operation 610. In other words, the common attributes are extracted from the dissimilar CDRs in order to be used for aggregation. In operation 630 the CDR Aggregator 220 generates an aggregated form of the CDRs according to the common attributes selected by the user in operation 540 shown in FIG. 5., so that the aggregated and transmuted CDRs are provided to the user through the GUI or other mode of communication.

As described from the foregoing, the present invention advantageously provides the user (i.e., network administrator or maintenance personnel) with improved tools, systems, and methods for the management and analysis of detail records in such a mobile telephony network, including the ability to correlate and aggregate dissimilar CDRs to provide a high level view of the health of the mobile telephony network, by providing to the user an easy to read high-level view of the health of calls occurring in the network. By viewing dissimilar calls that have been correlated and aggregated according to one or more common attributes of the dissimilar calls, the user can easily identify targeted problem areas of the calls, and can further select calls from the aggregated list for further detailed analysis.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions, and sub-combinations may be made to adapt the teachings of the present invention to a particular situation without departing from the scope thereof. In addition, the mobile network has been described in the context of a telecommunications network having an architecture typical of North America and employing the SS7 protocol, it should be appreciated that the present invention is not limited to this particular telecommunications network or protocol. Rather, the invention is applicable to other communications networks and compatible signalling protocols, for example an Integrated Systems Digital Network (ISDN), a Voice over IP (VoIP) network, the Internet, or a cellular communications system, such as a Global System for Mobile communications (GSM) network or a Universal Mobile Telecommunications System (UMTS) network. Moreover, alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Lastly, the CDR repository can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. A system to monitor a mobile network, the system comprising: a data record generator to receive, on a real-time basis, a data stream from one or more monitoring points of the mobile network and generate detail records of information transactions in the mobile network; and a data record aggregator to receive the detail records from the data record generator, correlate dissimilar detail records from different ones of the monitoring points according to one or more common attributes of the dissimilar detail records, aggregate at least a portion of the correlated detail records into a single group, and send aggregated detail records in the single group, via either a user input for a visual display or a selected mode of delivery for alerting a user of the aggregated detail records; wherein the aggregated detail records are displayed, via the user input, or alternatively, transmitted, via the selected mode of delivery in the form of an email or instant message (IM) to alert the user of the aggregated detail records.

2. The system of claim 1, wherein a user determines, via the user input, an amount of the information presented in the aggregated detail records.

3. The system of claim 1, wherein the aggregated detail records displayed, via the user input, comprise at least one of the common attributes of the dissimilar detail records.

4. The system of claim 1, wherein the user input displays a complete detail record in response to a user selecting one of the aggregated detail records display, via the user input.

5. The system of claim 1, wherein a user determines, through the user input, the one or more common attributes used to correlate the dissimilar detail records to be displayed in the aggregated group.

6. The system of claim 1, wherein the aggregated detail records are displayed, via a plurality of user inputs, for a plurality of users, and each of the plurality of users determines the one or more common attributes used to correlate the dissimilar detail records to be displayed in the respective aggregated group.

7. The system of claim 1, wherein the one or more common attributes of the dissimilar detail records include one of a call type, start time, end time, success status, failure reason, or a combination thereof, and at least one of the one or more common attributes is extracted by the data record aggregator from different information comprised in the dissimilar detail records.

8. The system of claim 1, wherein the user input comprises a graphical user interface (GUI).

9. A method of monitoring a mobile network, the method comprising: receiving, on a real-time basis, a data stream from one or more monitoring points of the mobile network and generating detail records of information transactions in the mobile network; correlating dissimilar detail records from different ones of the monitoring points according to one or more common attributes of the dissimilar detail records, and aggregating at least a portion of the correlated detail records into a single group; and providing aggregated detail records, via a user input for a visual display, or via a selected mode of delivery to alert a user of the aggregated detail records; wherein the aggregated detail records are displayed, via the user input, or alternatively, transmitted, via the selected mode of delivery in the form of an email or instant message (IM) to alert the user of the aggregated detail records.

10. The method of claim 9, further comprising displaying the aggregated detail records, via the user input, in a form having less information than comprised in the respective generated detail records.

11. The method of claim 10, further comprising a user determining, via the user input, an amount of the information displayed in the aggregated detail records, and the aggregated detail records displayed, via the user input, comprise at least one of the common attributes of the dissimilar detail records.

12. The method of claim 9, further comprising displaying a complete detail record in the user input in response to a user selecting one of the aggregated detail records displayed, via the user input.

13. The method of claim 9, further comprising a user determining, via the user input, the one or more common attributes used to correlate the dissimilar detail records to be displayed in the aggregated group.

14. The method of claim 9, further comprising displaying the aggregated detail records, via a plurality of user inputs, for a plurality of users, and each of the plurality of users determining the one or more common attributes used to correlate the dissimilar detail records to be displayed, via the respective aggregated group.

15. The method of claim 9, further comprising each of the plurality of users determining an amount of the information displayed, via the respective aggregated group.

16. The method of claim 14, wherein the one or more common attributes of the dissimilar detail records include one of a call type, start time, end time, success status, failure reason, or a combination thereof, and wherein the user input comprises a graphical user interface (GUI).

17. A computer readable medium encoded with processing instructions to perform a method of monitoring a mobile network, the method comprising: receiving, on a real-time basis, a data stream from one or more monitoring points of the mobile network and generating detail records of information transactions in the mobile network; correlating dissimilar detail records from different ones of the monitoring points according to one or more common attributes of the dissimilar detail records, and aggregating at least a portion of the correlated detail records into a single group; and providing aggregated detail records, via a user input for a visual display, or via a selected mode of delivery to alert a user of the aggregated detail records; wherein the aggregated detail records are displayed, via the user input, or alternatively, transmitted, via the selected mode of delivery in the form of an email or instant message (IM) to alert the user of the aggregated detail records.

18. The computer readable medium of claim 17, wherein the method further comprises displaying the aggregated detail records, via the user input in a form having less information than comprised in the respective generated detail records; and displaying a complete detail record, via the user input in response to a user selecting one of the aggregated detail records displayed, via the user input.

19. The computer readable medium of claim 17, wherein the user input comprises a graphical user interface (GUI).

\* \* \* \* \*